(12) United States Patent
Eberly

(10) Patent No.: US 7,073,240 B2
(45) Date of Patent: Jul. 11, 2006

(54) DUCT JOINT LAYOUT TOOL

(76) Inventor: Dwayne K. Eberly, 242 Habecker Church Rd., Lancaster, PA (US) 17602

( * ) Notice: Subject to any disclaimer, the term of this patent is extended or adjusted under 35 U.S.C. 154(b) by 122 days.

(21) Appl. No.: 10/879,560

(22) Filed: Jun. 29, 2004

(65) Prior Publication Data

US 2005/0283977 A1    Dec. 29, 2005

(51) Int. Cl.
B23P 17/00 (2006.01)
B43L 7/00 (2006.01)

(52) U.S. Cl. ............. 29/425; 29/890.14; 29/557; 29/558; 33/474; 33/476; 33/482; 33/494

(58) Field of Classification Search .............. 33/474, 33/476, 481, 482, 494, 403, 404, 423; 29/425, 29/557, 558, 890.14
See application file for complete search history.

(56) References Cited

U.S. PATENT DOCUMENTS

| | | | |
|---|---|---|---|
| 2,610,407 A | 9/1952 | McQuaid | |
| 4,179,808 A | 12/1979 | Smith | |
| 4,345,383 A * | 8/1982 | Corsette | 33/474 |
| 4,404,753 A * | 9/1983 | Klok | 33/451 |
| 4,455,760 A | 6/1984 | Arceneaux | |
| 4,513,510 A | 4/1985 | Swanson | |
| 4,545,130 A * | 10/1985 | Corsette | 33/474 |
| 4,608,902 A | 9/1986 | Ivey | |
| 4,742,619 A * | 5/1988 | Swanson | 33/474 |
| 4,776,250 A * | 10/1988 | Julius | 83/745 |
| 4,951,539 A * | 8/1990 | Buckner | 83/884 |
| 5,170,568 A * | 12/1992 | Wright | 33/480 |
| 5,575,074 A * | 11/1996 | Cottongim et al. | 33/474 |
| 5,727,325 A | 3/1998 | Mussell | |
| 5,864,959 A * | 2/1999 | Johansen et al. | 33/474 |
| 5,933,974 A * | 8/1999 | Walters et al. | 33/474 |
| 6,230,416 B1 * | 5/2001 | Trigilio | 33/474 |
| 6,314,652 B1 * | 11/2001 | English | 33/421 |
| 6,622,394 B1 | 9/2003 | Werner | |
| 6,688,014 B1 | 2/2004 | Allemand | |
| 6,725,556 B1 * | 4/2004 | Graham | 33/474 |
| 6,868,616 B1 * | 3/2005 | Allemand | 33/476 |
| 6,918,189 B1 * | 7/2005 | McBrayer | 33/566 |

* cited by examiner

Primary Examiner—Essama Omgba
(74) Attorney, Agent, or Firm—Andrew D. Mead

(57) ABSTRACT

A layout tool and a means for using the tool to fabricate multi-segment elbows and offset joints from rectangular cross-section fibrous air ductboard material. The tool has a triangular main body having at least one structural feature that defines a plane. At least one flange is connected to the main body, is oriented substantially perpendicular to the main body plane, and forms the first side of the triangle. The main body includes a first outer straight edge extending at an angle of 67.50 degrees from the flange forming the second side of the triangle. A second outer straight edge extending at an angle of 78.75 degrees from the flange forms the third side of the triangle. An inner structure of the main body forms a straight edge perpendicular to the plane of the flange. The outer angled and interior straight edges enable 22.5- and 45-degree miter joints to be easily marked and cut in pre-formed fibrous air duct. Markings on the main body indicate required distances between cuts to accomplish desired offset rises.

5 Claims, 8 Drawing Sheets

— 30

| THROAT | 3 PIECE ELBOW | 5 PIECE ELBOW |
|---|---|---|
| 2" | 2⅞" | |
| 4" | 5⅝" | 2" |
| 6" | 8½" | 3" |
| 8" | 11⅜" | 4" |
| 10" | 14⅛" | 5" |
| 12" | 17" | 6" |
| 14" | 19¾" | 7" |
| 16" | 22⅝" | 7⅞" |
| 18" | 25½" | 8⅞" |
| 20" | 28¼" | 9⅞" |

| OFFSET/RISER TABLE | | |
|---|---|---|
| OFFSET/RISER | 45° | 22½° |
| 1" | 1½" | 2¾" |
| 2" | 2⅞" | 5¼" |
| 3" | 4¼" | 7⅞" |
| 4" | 5⅝" | 10½" |
| 5" | 7⅛" | 13⅛" |
| 6" | 8½" | 15¾" |
| 7" | 9⅞" | 18¼" |
| 8" | 11⅜" | 21" |
| 9" | 12¾" | 23½" |
| 10" | 14⅛" | 26⅛" |
| 11" | 15½" | 28¾" |
| 12" | 17" | 31⅜" |
| 13" | 18¼" | 34" |
| 14" | 19⅞" | 36⅝" |
| 15" | 21⅛" | 39⅛" |
| 16" | 22⅝" | 41⅞" |
| 17" | 24" | 44⅜" |
| 18" | 25½" | 47" |
| 19" | 26⅞" | 49⅝" |
| 20" | 28¼" | 52¼" |

*FIG. 4*

DUCT JOINT LAYOUT TOOL

BACKGROUND OF THE INVENTION

1. Field of the Invention

This invention relates generally to the field of measuring and marking tools having a generally triangular configuration and a flange, perpendicular to one side, projecting above and below the upper and lower surfaces of the triangle, and upon which linear measurement markings are provided on the surfaces of the triangle along the respective edge portions. In particular, this invention relates to tools having a scalene triangular configuration in which the angular orientation of the sides relative to the flange are common angles used in mitered construction and markings on a surface of the triangle providing commonly used mitered air duct joint fabrication measurements.

The use of fibrous ductboard material for heating and air conditioning ducts is well known. Such ductboard typically includes a layer of fiberglass attached to a composite outer covering. The outer covering is typically made up of a layer Kraft paper, a layer of scrim-like material, and a foil-like layer, the composition providing stiffness and forming an air-impervious outer layer for the duct. Fibrous ductboard material is commonly available in flat-sheet form or pre-formed into rectangular cross-section ducts in a variety of sizes. When flat-sheet material is used, it is conventional to cut, either by machine or the installer, a set of laterally-spaced-apart, longitudinal grooves in the fiberglass side of flat-sheet ductboard to form rectangular cross-section duct sections.

It is also well known in the duct construction field that fittings, such as elbows and offsets, may be fabricated from the ductboard material using mitered cuts on the duct. For example, a simple 90-degree elbow can be formed by cutting the duct along a plane oriented 45 degrees to the longitudinal duct axis, rotating one segment one-half turn about its longitudinal axis, and connecting the two sections at the cut plane to form a 90-degree mitered elbow. Fittings having more gradual transitions, thereby imposing less resistance on air flow, are commonly formed by reducing the miter angle and increasing the number of duct segments comprising the fitting.

In preparation for making a duct fitting, the user assembles tools including a marking pencil, an incrementally marked straight edge, a protractor, and a cutting knife and determines the dimensions of the desired fitting. The user then makes a series of cutting marks, or layout lines, on the ductboard material to define a cutting plane. Conventional flaming squares or carpenter's triangles are typically employed to make layout lines oriented perpendicular to the longitudinal axis of the duct. Non-perpendicular layout lines require the user to establish two points along the desired line with a protractor or other similar tool and then make a line using a straight edge. The duct can then be cut by drawing a cutting knife along the layout line, optionally using a straight edge as a guide, and cutting all the way thorough the ductboard material. Finally, the user aligns the resulting duct segments to form the desired fitting, reconnects the segments with adhesive, and seals the connection with duct tape. Drawbacks in using the above-described tools and method for making mitered elbows and offsets are the considerable length of time involved and the limited quality and accuracy of the resulting joint due to variations in measuring and cutting.

It is therefore the principle objective of the present invention to provide a tool and a method for selecting and making a series of quick layout lines for the most common miter angles used in air duct fitting fabrication and for aligning the edge of a cutting tool in making the cuts. It is another objective of the present invention to provide a tool and a method for controlling the accuracy and quality of miter joint cuts.

2. Description of Related Art

Numerous measuring and marking tools of the right-triangular type are known in the prior art. U.S. Pat. No. 4,513,510, by Swanson, discloses a right-triangular-shaped layout tool with a T-flange base on one side, and which is adaptable with a layout bar to provide a means for repeated marking of predetermined angles as are common in marking of stair stringer boards. U.S. Pat. No. 5,727,325, by Mussell, discloses a right-triangular-shaped tool with a T-flange on one side and markings to facilitate aligning the tool on workpieces at selected angles commonly used in rafter and stair stringer framing. U.S. Pat. No. 6,622,394, by Werner, discloses a right-triangular-shaped measuring tool with a T-flange for aligning the tool base to the workpiece. Indicia along the hypotenuse in conjunction with a defined origin allow marking of acute angles commonly used in deck construction. U.S. Pat. No. 6,688,014, by Allemand, discloses a right-triangular-shaped measuring and marking tool that includes internal structures for marking frequently used wood frame construction dimensions and a method of using the tool to mark layout lines common in wood frame construction.

These measuring and marking tools have limited efficacy compared with the present invention. All are based on a right triangle having a flange perpendicular to one leg of the triangle useful for rapidly aligning the tool with an edge of the workpiece. The limitation with this right-triangular design is that the second leg of the right triangle is always perpendicular to the flange, leaving only the hypotenuse available for non-perpendicular layout lines. To overcome this limitation, each tool includes structures for marking other common framing angles. However, using these features is a multi-step operation. One method requires making a pair of marks to define a line, moving the tool, and using a straight edge to draw the desired line. Another method requires visually aligning two or more points on the tool with a reference edge of the workpiece to establish the desired angle and then drawing the desired line. In the former method, making a layout line is a three-step process; the second method requires two steps and fails to take advantage of the T-flange for quick and accurate tool alignment with the workpiece.

In addition to framing tools, drawing instruments are known in the prior art. U.S. Pat. No. 2,610,407, by McQuaid, discloses a drafting instrument incorporating straight edges inclined at angles commonly used in making axonometric projection drawings. U.S. Pat. No. 4,455,760, by Arceneaux, discloses a drafting instrument incorporating straight edges inclined at angles commonly used in making isometric projection drawings. These instruments depart from a standard right-triangular-shaped design and incorporate interior structures thereby increasing the number of straight edges offered in a single instrument. As drafting instruments, these instruments do not incorporate a T-flange to align the instrument against a workpiece corner. Alignment to a reference line is commonly performed using a T-square or similar drafting apparatus.

Layout and fabrication tools specifically useful for working with fibrous ductboard material are also well known in the prior art. U.S. Pat. No. 4,179,808, by Smith, discloses a movable tool guide for cutting and removing wedge-shaped pieces from sheet-form fibrous ductboard material enabling air duct transition pieces of a range of sizes to be formed. U.S. Pat. No. 4,608,902, by Ivey, discloses a portable measuring and cutting tool guide for cutting parallel V-grooves in fibrous ductboard material enabling rectangular air duct to be formed from flat-sheet material. These tools are designed to make layout lines and cuts on ductboard material in sheet form needed to form rectangular cross-section ducts, but they are not suited to working with pre-formed rectangular cross-section ducts.

SUMMARY OF THE INVENTION

The present invention is a measuring and layout tool providing straight edges oriented such that layout marks and cuts commonly used in fabricating elbows and offsets in rectangular cross-section duct can be made more easily. The invention essentially comprises a main body structure having a triangular outer perimeter with a flange affixed perpendicular to a base edge of the main body structure. The base-edge flange allows quick and consistent alignment of the tool with a corner edge of a rectangular cross-section duct workpiece so that the main body structure lies across a face of the workpiece.

One of the remaining two outer edges of the main body structure is offset 22.5 degrees from a line perpendicular to the base-edge flange. Miter cuts of 22.5 degrees are used to form 45-degree miter joints in ducts. Two 45-degree miter joints may be combined to form a three-segment, 90-degree elbow fitting. Forty-five-degree miter joints may also be use to fabricate sharp transition offset fittings useful for making parallel shifts, or offsets, of the longitudinal duct axis.

The remaining outer edge of the main body structure is offset 11.25 degrees from a line perpendicular to the base-edge flange. Miter cuts of 11.25 degrees are used to form 22.5-degree miterjoints in ducts. Four 22.5-degree miter joints may be combined to form a 90-degree elbow fitting having a smoother transition than the elbow fitting made using 45-degree miter joints. Smooth transition offset fittings using 22.5-degree miter joints may also be fabricated using the 11.25-degree outer edge of the layout tool.

A portion of the main body structure is removed to form an interior structure having a straight edge oriented perpendicular to the base-edge flange. The perpendicular straight edge aids in layout and cutting of duct faces that must be cut perpendicular to the longitudinal duct axis to form a mitered duct joint.

BRIEF DESCRIPTION OF THE DRAWINGS

The invention is shown in FIGS. 1 through 4.

FIG. 3 shows a table located on a planar surface of the main body structure with common duct elbow fabrication measurements.

FIG. 4 shows a table located on a planar surface of the main body structure with common offset riser fabrication measurements.

FIG. 5 shows a workpiece with the layout tool in position to make a first layout line.

FIG. 6 shows the workpiece with the layout tool in position to make a second layout line.

FIG. 7 shows the workpiece with the layout tool in position to make a third layout line.

FIG. 8 shows the workpiece with the layout tool in position to make a fourth layout line.

FIG. 9 shows two segments of the workpiece after cutting along the plane defined by the four layout lines.

FIG. 10 shows a two-segment mitered duct joint fitting.

FIG. 11 shows a workpiece with layout lines for a three-segment, 90-degree elbow having a specified throat dimension.

FIG. 12 shows a completed three-segment, 90-degree elbow fitting.

FIG. 13 shows workpiece with layout line for a five-segment, 90-degree elbow having a specified throat dimension.

FIG. 14 shows a completed five-segment, 90-degree elbow fitting.

FIG. 15 shows a workpiece with layout lines for an offset fitting.

FIG. 16 shows a completed offset fitting of a selected rise.

DETAILED DESCRIPTION OF THE INVENTION

Figure 1:
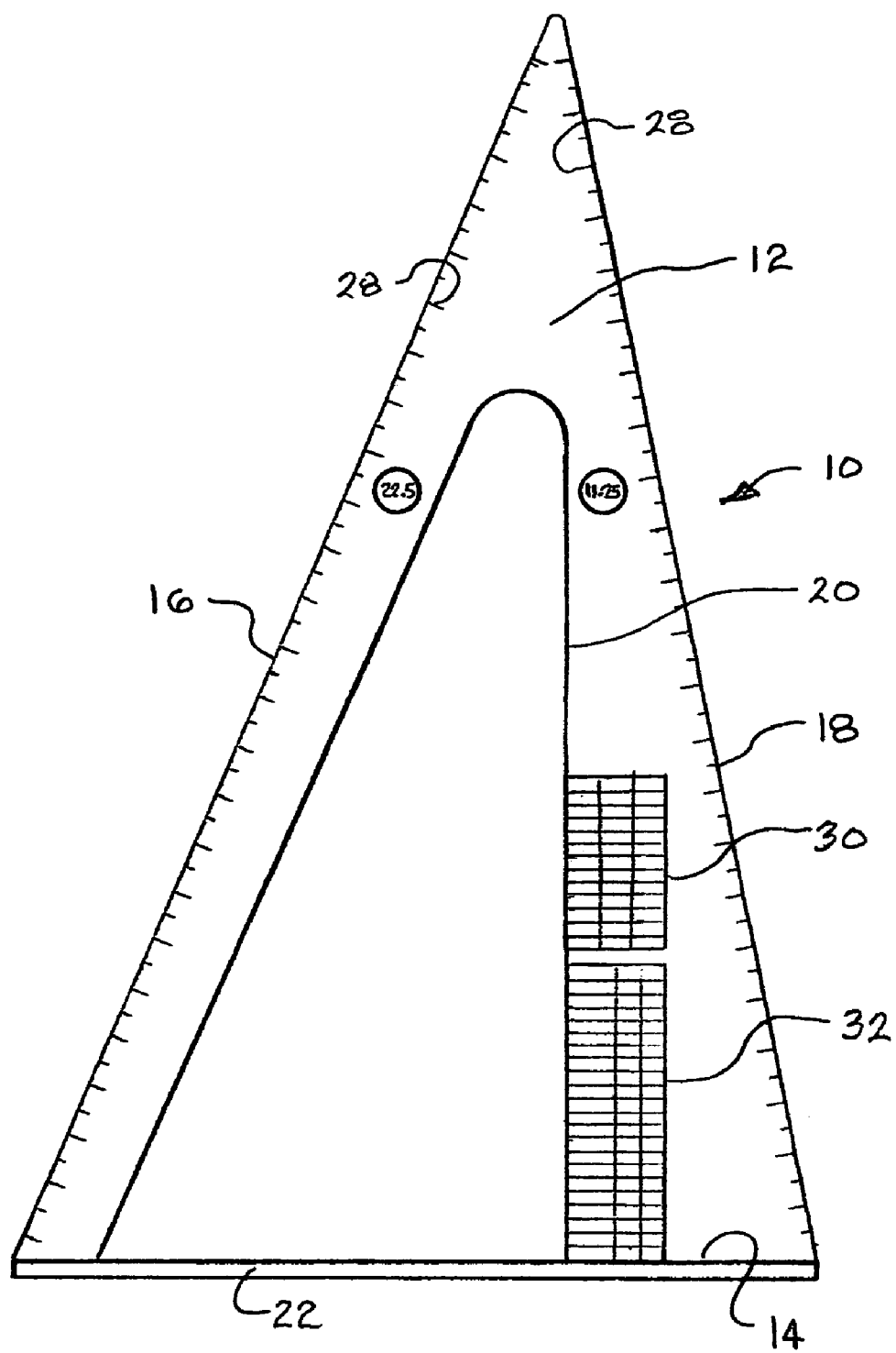
FIG. 1 is a front view of the invention showing the main body structure.

The preferred embodiment shown in FIG. 1 is a layout tool 10 consisting of a main body structure 12 having a generally triangular periphery and a substantially planar surface. The periphery of main body structure 12 is formed by base edge 14, 22.5-degree straight edge 16, and 11.25-degree straight edge 18. In the preferred embodiment, base edge 14 measures approximately 14⅝ inches long, 22.5-degree straight edge 16 is approximately 25⅝ inches long, and 11.25-degree straight edge is approximately 24⅛ inches long. A portion of main body structure 12 is removed to form an interior opening that includes 90-degree straight edge 20. The layout tool 10 has a first planer surface 24 facing in one direction and a second planar surface 26 facing in the opposite direction, said surfaces being parallel and separated by a short distance ranging from about ⅛ inch to ¼ inch. Though the invention may be made of any suitably rigid material, such as steel, aluminum, or plastic, the preferred embodiment is made of plastic.

Linear measure markings 28 located on first planar surface 24 along 22.5-degree straight edge 16 and along 11.25-degree straight edge may be used to define distances in the manner as a ruler.

A first data table 30 is marked on first planar surface 24 and provides information useful for elbow-fitting layout. First data table 30 is shown in FIG. 3. A second data table 32 is also marked on first planar surface 24 and provides information useful for offset fitting layout. Second data table 32 is shown in FIG. 4. Use of first data table 30 and second data table 32 is described later in this specification.

Figure 2:
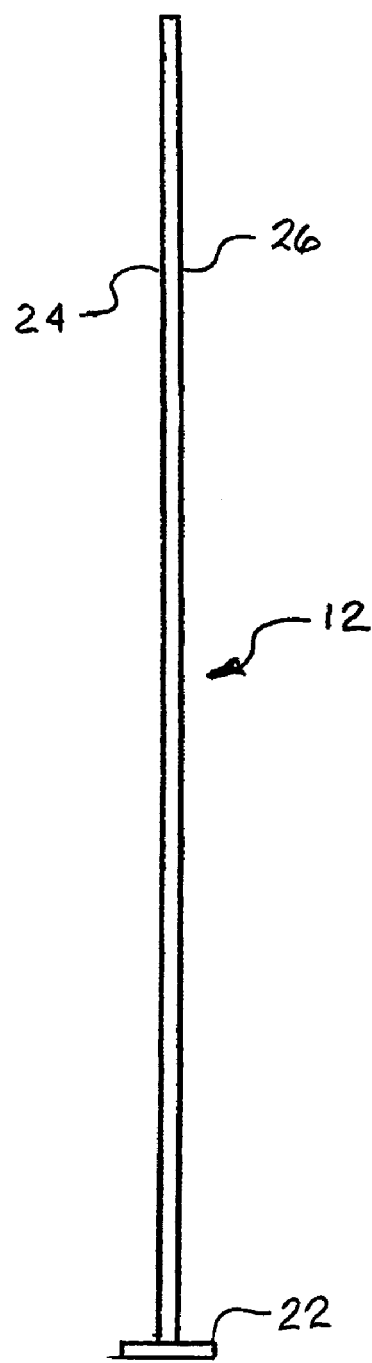
FIG. 2 is an edge view of the invention showing the base flange in relation to the main body structure.

Referring to FIG. 2, base flange 22 is shown affixed to main body structure 12. Base flange 22 is oriented perpendicularly to main body structure 12 such that a first portion of base flange 22 extends outwardly from first planar surface 24 approximately ⅝ inch and a second portion of base flange 22 extends outwardly from second planar surface 26 approximately ⅝ inch. The length of base flange 22 is approximately equal to the length of base edge 14.

Fabricating rectangular cross-section duct fittings requires the user to make at least one miter cut of the duct. Using layout tool 10 improves the efficiency of the layout and cutting steps. Forming a miter cut of a rectangular cross-section duct requires the user to cut each of the four faces of the duct. The user must cut two faces opposite of each other at an acute angle measured relative to the longitudinal axis of the duct. The remaining two faces of the duct must be cut along lines that are perpendicular to the longitudinal axis of the duct; however, the cuts through the ductboard wall thickness must be angled to match the acute angle used for the first angled cuts.

The user first determines the orientation of the desired bend in relation to the duct dimensions to identify a starting point 110. Staring point 110 is located on a first longitudinal corner 112 of workpiece 50. If the duct cross-section is square, the location of starting point 110 is immaterial. For rectangular cross-sections, the user's determination is based on whether the miter bend occurs on the major side or on the minor side of the duct. For major-side miters, the user makes cuts displaced by an angle from a line perpendicular to the longitudinal duct axis on the major sides of the duct to form the miter. Cuts on the minor sides are made perpendicular to the longitudinal duct axis. For minor-side miters, the user makes the angled cuts on the minor sides and perpendicular cuts on the major sides.

Next, the user determines the miter angle necessary for the desired fitting. Layout tool 10 is useful for making 22.5-degree and 45-degree miter bends in rectangular cross-section ducts. A 45-degree miter bend is used in this description. Forming a 22.5-degree miter bend from this description requires only substitution of 22.5-degree straight edge 16 with 11.25-degree straight edge 18 in the following description.

Figure 5:
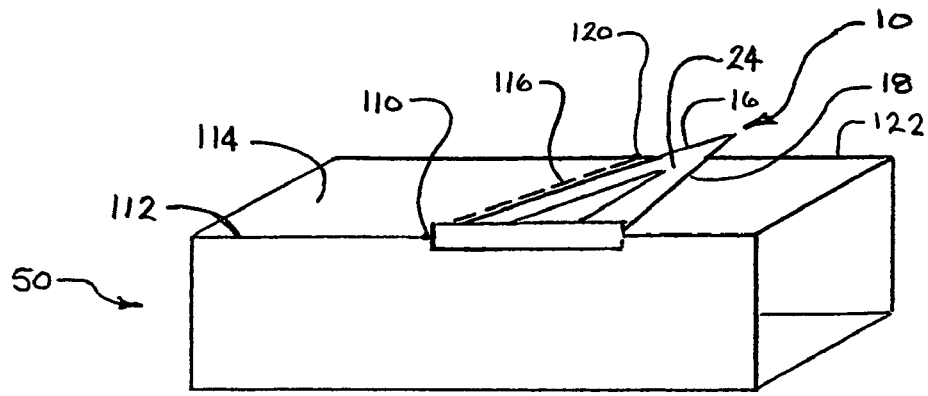
FIGS. 5 through 16 show the method of using the invention and typical air duct fittings that can result. The invention and workpiece are shown in solid lines in FIGS. 5 through 8 and the layout lines are shown in dashed lines.

Once starting point 110 is determined, the user positions layout tool 10 on workpiece 50 so that the intersection of base flange 22 and main body structure 12 rests along first longitudinal corner 112, main body structure 12 rests on first face 114, and 22.5-degree straight edge 16 is aligned with starting point 110 oriented in the desired direction of the miter cut as shown in FIG. 5. First planar surface 24 faces away from workpiece 50, but if the desired miter is in the opposite direction, layout tool 50 could be turned over so that first planar surface 24 is adjacent to workpiece 50. With layout tool 10 positioned, the user makes first layout line 116 on first face 114 along 22.5-degree straight edge, extending from first longitudinal corner 112 to second longitudinal corner 122. Second point 120 is located at the intersection of first layout line 116 and second longitudinal corner 122. The user cuts the ductboard material along first layout line 116 with the cutting blade oriented perpendicular to the plane of first face 114.

Figure 6:
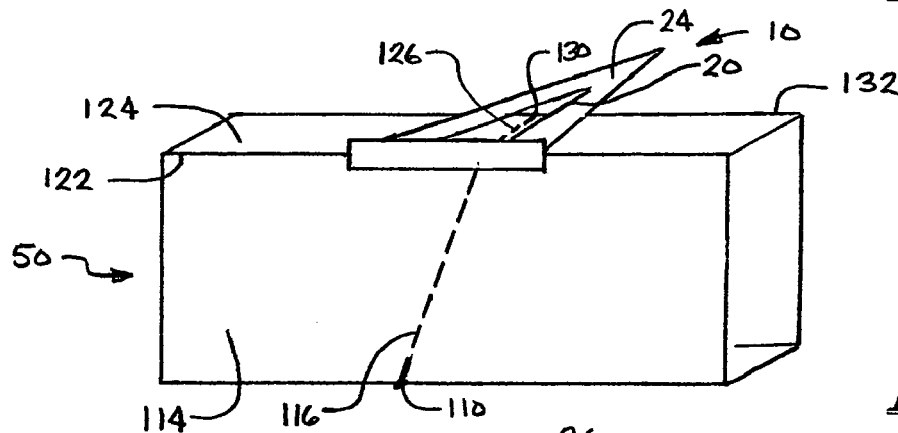

In FIG. 6, the user positions layout tool 10 on workpiece 50 so that the intersection of base flange 22 and main body structure 12 rests along second longitudinal corner 122, main body structure 12 rests on second face 124, and 90-degree straight edge 20 is aligned with second point 120. Second face 124 is adjacent to first face 114. With layout tool 10 positioned, the user makes second layout line 126 on second face 124 along 90-degree straight edge 20, extending from second longitudinal corner 122 to third longitudinal corner 132. Second point 120 is located at the intersection of first layout line 116 and second longitudinal corner 122. The user cuts the ductboard material along second layout line 126 with the cutting blade oriented parallel to first layout line 116.

Figure 7:
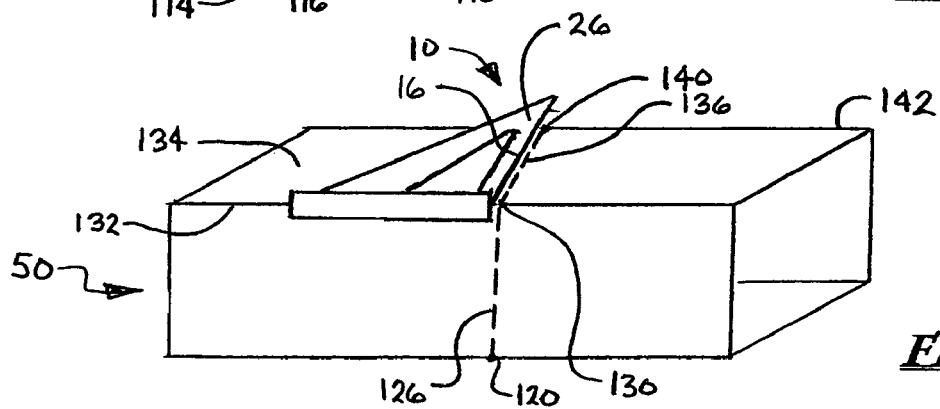

The method of making a layout line and cutting third face 134 is shown in FIG. 7. Third face 134 is adjacent to second face 124 and opposite of first face 114. The user positions layout tool 10 on workpiece 50 so that the intersection of base flange 22 and main body structure 12 rests along third longitudinal corner 132, main body structure 12 rests on third face 134, and 22.5-degree straight edge 16 is aligned with third point 130 and oriented such that it is parallel with first layout line 116. Aligning 22.5-degree straight edge so that it is parallel with first layout line 116 generally requires the user to turn layout tool 10 over so that the planar face that was adjacent to workpiece 50 to make the first and second layout lines now faces away from workpiece 50. As shown, second planar surface 26 faces away from workpiece 50. With layout tool 10 positioned, the user makes third layout line 136 on third face 134 along 22.5-degree straight edge, extending from third longitudinal corner 132 to fourth longitudinal corner 142 and parallel to first layout line 116. Fourth point 140 is located at the intersection of third layout line 136 and fourth longitudinal corner 142. The user cuts the ductboard material along third layout line 136 with the cutting blade oriented perpendicular to the plane of third face 134.

Figure 8:
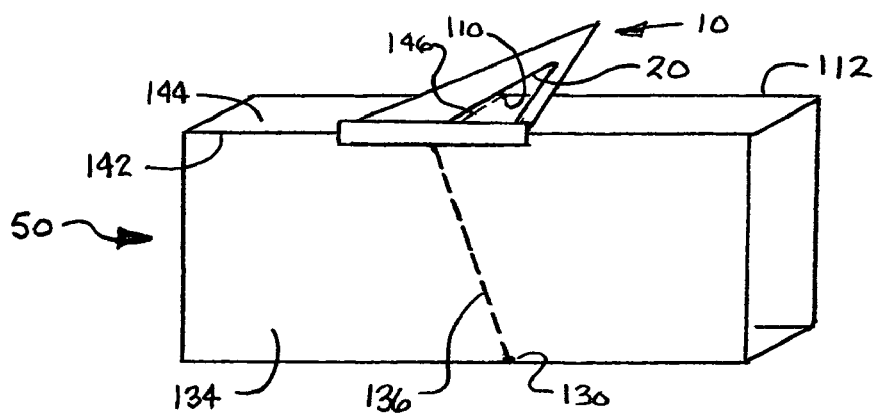

As shown in FIG. 8, the user positions layout tool 10 on workpiece 50 so that the intersection of base flange 22 and main body structure 12 rests along fourth longitudinal corner 142, main body structure 12 rests on fourth face 144, and 90-degree straight edge 20 is aligned with fourth point 140. In this position, straight edge 20 also aligns with starting point 110 on first longitudinal corner 112. Fourth face 144 is adjacent to first face 114 and opposite of second face 124. With layout tool 10 positioned, the user makes fourth layout line 146 on fourth face 144 along 90-degree straight edge 20, extending from fourth longitudinal corner 142 to first longitudinal corner 112. The line should intersect first layout line 116 at starting point 110. The user cuts ductboard material along fourth layout line 146 with the cutting blade oriented parallel to first layout line 116.

Figure 9:
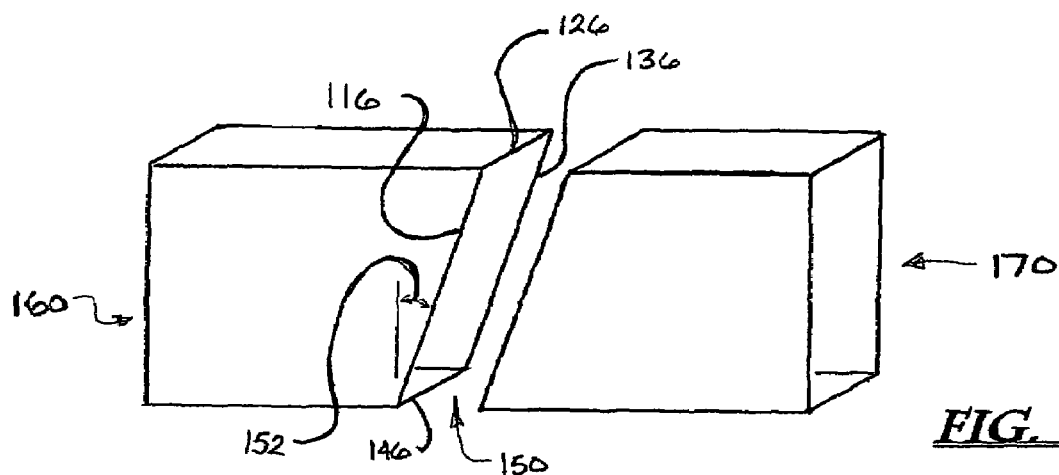

In FIG. 9, cutting plane 150 is defined by first layout line 116, second layout line 126, third layout line 136, and fourth layout line 146. Cutting plane 150 is oriented at miter-cut angle 152 which is measured from a plane perpendicular to the longitudinal axis of the duct, 22.5 degrees in the described example. Cutting workpiece 50 along cutting plane 150 results in a first segment 160 and a second segment 170.

Figure 10:
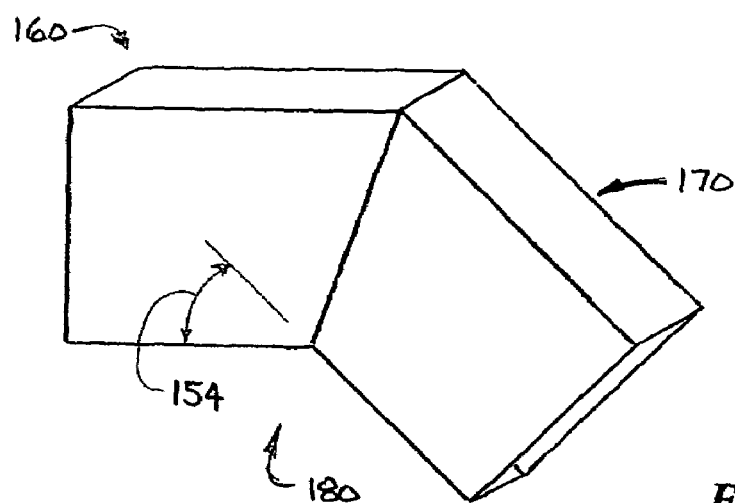

FIG. 10 shows mitered fitting 180. Mitered fitting 180 is formed by joining first segment 160 and second segment 170 at cutting plane 150 after rotating either first segment 160 or second segment 170 by 180 degrees about its longitudinal axis. The two segments are joined at cutting plane 150 using conventional adhesives and tape. Miter angle 154 is the angular displacement of the longitudinal axis of mitered fitting 180. The value of miter angle 154 is twice the value of miter-cut angle 152.

Figure 11:
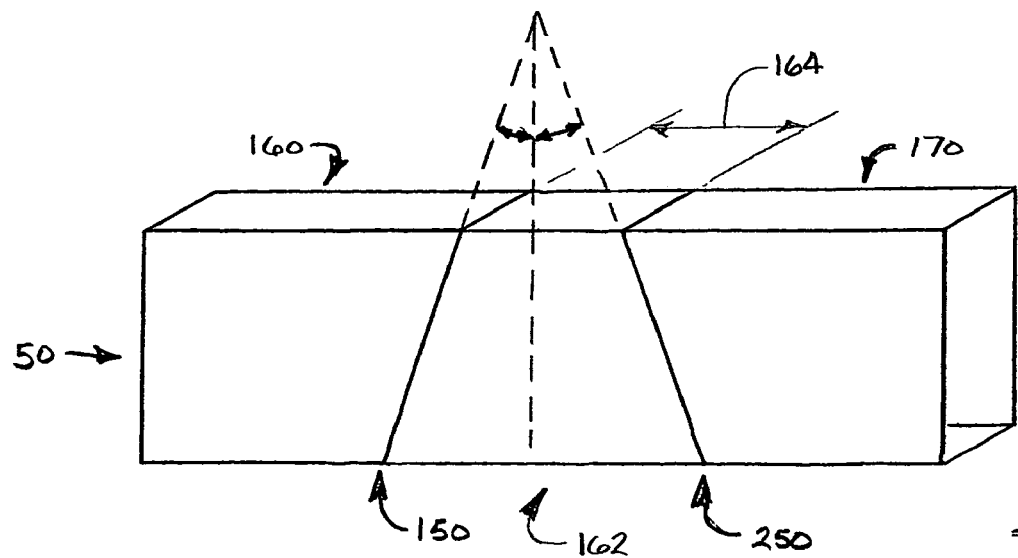
Figure 12:
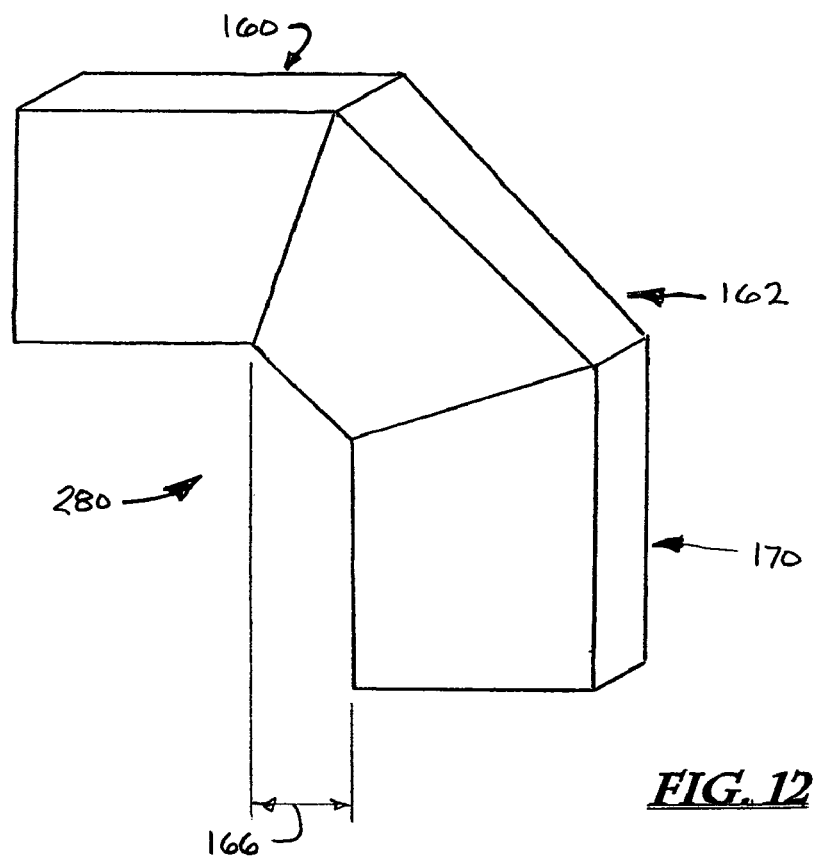

Users can form a variety of duct fittings by making additional cuts specifically oriented relative to first cutting plane 150 and selecting an appropriate miter angle for the cutting plane using layout tool 10 and the method described. Referring to FIG. 11, a three-segment, 90-degree elbow can be formed by marking a second cutting plane 250 on workpiece 50 using layout tool 10 such that the angle between first cutting plane 150 and second cutting plane 250 is bisected by a plane perpendicular to the longitudinal axis of the duct. First cutting plane 150 and second cutting plane 250 are separated by inside measure 164. The user determines inside measure 164 by selecting the desired throat 166 to suit construction needs. Throat 166 may also be referenced as an inside radius of the elbow fitting. The user locates the desired throat on first data table 30 and selects the corresponding inside measure 164. When the user cuts workpiece 50 along the first and second cutting planes, three segments result, shown in FIG. 11 as first segment 160, second segment 170, and third segment 162. Third segment 162 is in the shape of an isosceles trapezoid when a face on which miter cuts are made is viewed perpendicularly. By rotating third segment 162 by 180 degrees about its longitudinal axis and joining the three segments at the cuttings planes, the user can form a 90-degree, three-segment elbow 280 having two 45-degree miter joints and a desired throat 166 as shown in FIG. 12.

Figure 13:
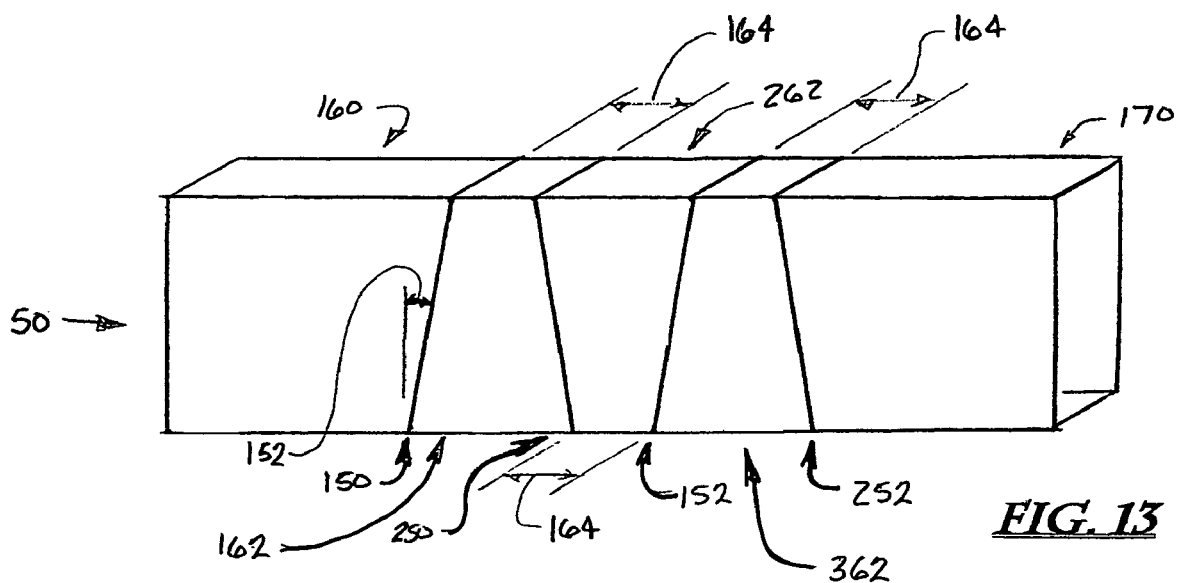
Figure 14:
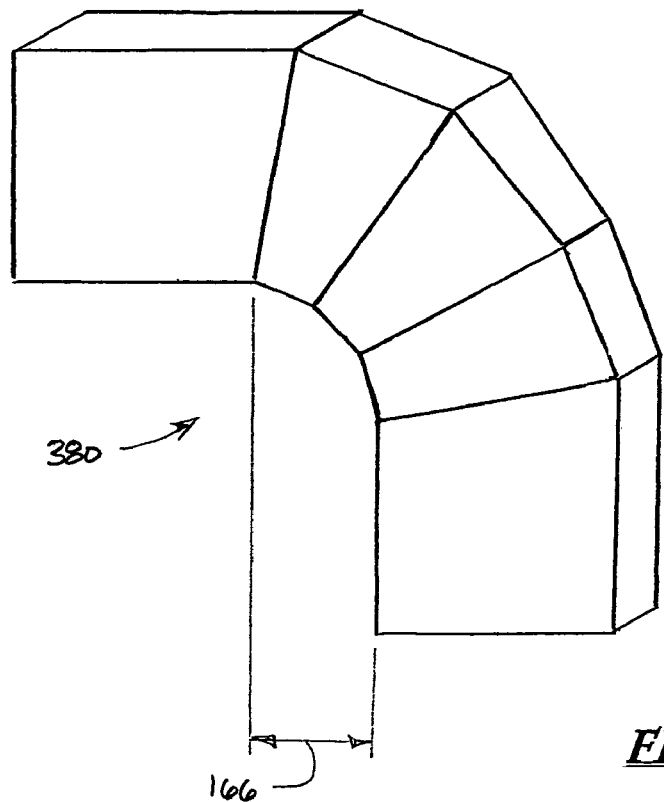

FIGS. 13 and 14 show a five-segment, 90-degree elbow fitting that can be formed by selecting a miter cut angle 152 of 11.25 degrees which may be accomplished by using 11.25-degree straight edge of layout tool 10 to lay out and cut the angled faces of workpiece 50. Five-segment, 90-degree elbows are desirable since their use results in less resistance to air flow in a completed duct. A five-segment, 90-degree elbow 380 can be formed by marking a second cutting plane 250, a third cutting plane 152, and a fourth cutting plane 252 on workpiece 50 using layout tool 10. The angle between first cutting plane 150 and second cutting plane 250 is bisected by a plane perpendicular to the longitudinal axis of the duct. Third cutting plane 152 is oriented parallel to first cutting plane 150. Fourth cutting plane 252 is oriented parallel to second cutting plane 250. Each cutting plane is separated from the adjacent cutting plane by inside measure 164. Inside measure 164 is determined by selecting the desired throat 166 to suit construction needs. Throat 166 may also be referenced as an inside radius of the elbow fitting. The user determines inside measurement 164 by locating the desired throat on first data table 30 and selecting the corresponding inside measurement 164. When the user cuts workpiece 50 along the cutting planes, five segments result, shown in FIG. 13 as first segment 160, second segment 170, third segment 162, fourth segment 262, and fifth segment 352. Third segment 162, fourth segment 262, and fifth segment 362 have the same geometric shape and dimensions. The segments have the shape of an isosceles trapezoid when a face on which miter cuts are made is viewed perpendicularly. By rotating third segment 162 and fifth segment 362 by 180 degrees about their longitudinal axis and joining the five segments at the cuttings planes, the user forms a 90-degree, five-segment elbow 380 having four 22.5-degree miter joints and a desired throat 166 as shown in FIG. 14.

Figure 15:
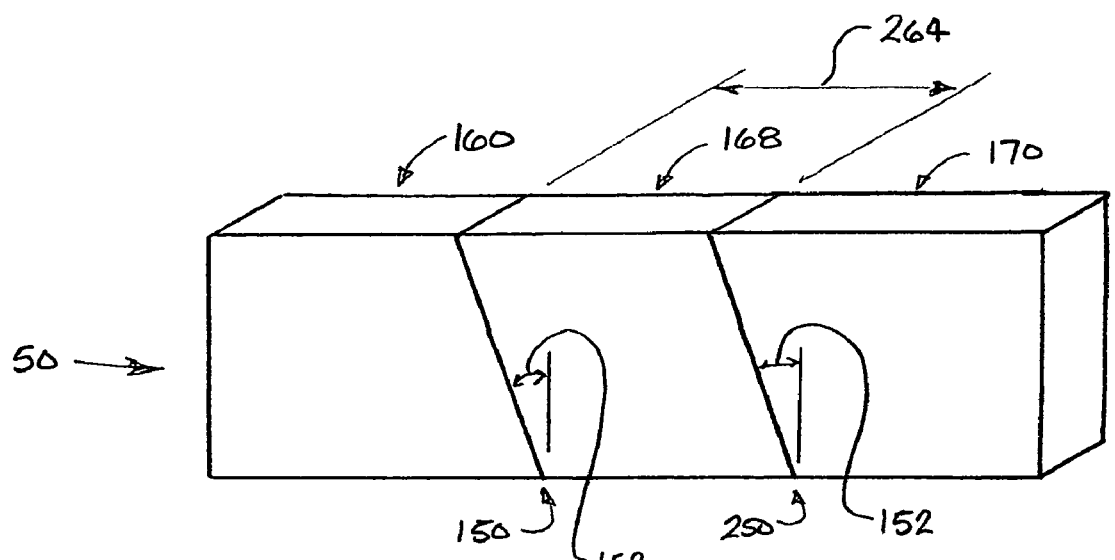
Figure 16:
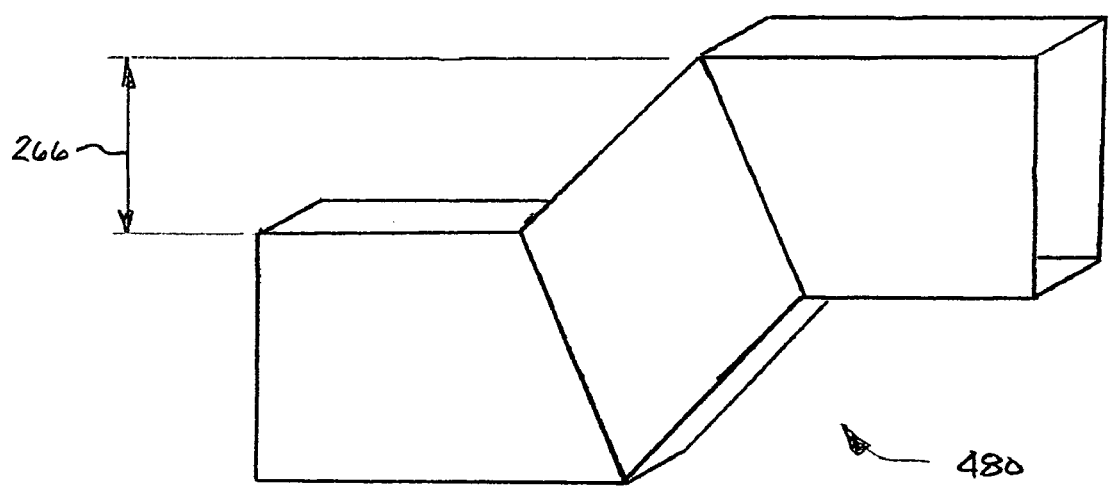

FIGS. 15 and 16 show an offset transition fitting fabricated using layout tool 10 and the described method for making a cutting plane. Offset transition fitting 480 may be fabricated by making a second cutting plane 250 on workpiece 50 such that second cutting plane 250 is oriented parallel to first cutting plane 150. First cutting plane 150 and second cutting plane 250 are separated by offset measure 264. The user determines offset measure 264 by selecting the desired offset 266 and miter angle 152 to suit construction needs. A miter angle of 22.5 degrees results in 45-degree miter joints and is referred to as a sharp offset. A miter angle of 11.25 degrees results in 22.5-degree miter joints and is referred to as a gradual offset. The user locates the desired offset dimension on second data table 32, selects either sharp offset or gradual offset, and selects the corresponding offset measure 264. When the user cuts workpiece 50 along the first and second cutting planes, three segments result, shown in FIG. 15 as first segment 160, second segment 170, and third segment 168. Third segment 168 is in the shape of a parallelogram when a face on which miter cuts are made is viewed perpendicularly. By rotating third segment 168 by 180 degrees about its longitudinal axis and joining the three segments at the cuttings planes, the user forms a three-segment offset 480 having a desired offset 266 as shown in FIG. 15.

It is to be understood that the form of this invention as shown is merely a preferred embodiment and the methods described are ones most commonly used. This invention may be embodied in several forms without departing from its function. Various changes may be made in the function and arrangement of parts; equivalent means may be substituted for those illustrated and described; and certain features may be used independently from others without departing from the spirit and scope of the invention as defined in the following claims.

I claim:

1. A layout tool useful for fabricating mitered elbow fittings in rectangular air duct comprising:
    a main body structure having a periphery bounded by a base edge, a 22.5-degree straight edge, and a 11.25-degree straight edge, the main body structure having a substantially planar surface;
    a portion of the main body structure including an interior opening that includes a 90-degree straight edge, said 90-degree straight edge being perpendicular to the base edge;
    at least one base flange coupled to the base edge of the main body structure, said base flange oriented substantially perpendicular to the main body structure planar surface;
    a first corner formed by the junction of the base edge and the 22.5-degree straight edge, said first corner having an included angle of 67.50 degrees; and
    a second corner formed by the junction of the base edge and the 11.25-degree straight edge, said second corner having an included angle of 78.75 degrees.

2. The layout tool of claim 1, wherein markings indicating linear measure are provided on the surface of the main body structure along the 22.5-degree straight edge and along the 11.25-degree straight edge.

3. The layout tool of claim 1, wherein markings indicating geometrical relations and measures for common mitered fittings are provided on the planar surface of the main body structure.

4. A method of using a layout tool with a main body structure, a base flange perpendicular to the main body structure, a 90-degree straight edge, and a 22.5-degree straight edge to make a plurality of layout lines on a rectangular cross-section workpiece to define a cutting plane, comprising:
    selecting a desired orientation of the cutting plane on the workpiece;
    selecting a starting point for the layout lines on the workpiece such that the starting point is on a first longitudinal corner of a first face of the workpiece;
    placing the layout tool on the first face of the workpiece with the base flange along the first longitudinal corner and the 22.5-degree straight edge aligned with the starting point;
    making a first layout line on the first face along the 22.5-degree straight edge of the layout tool on the first face of the workpiece from the first longitudinal corner to a second longitudinal corner;
    placing said layout tool on a second face of the workpiece, the second face being adjacent to the first face, with the base flange against the second longitudinal corner and the 90-degree straight edge aligned with a second point formed where the first layout line intersects the second longitudinal corner;

making a second layout line on the second face along the 90-degree straight edge of the layout tool on the second face from the second longitudinal corner to a third longitudinal corner;

placing said layout tool on a third face of said workpiece, the third face being adjacent to the second face, with the base flange against the third longitudinal corner, the 22.5-degree straight edge aligned with a third point formed where the second layout line intersects the third longitudinal corner, and the 22.5-degree straight edge oriented parallel to the first layout line;

making a third layout line on the third face along the 22.5-degree straight edge of the layout tool from the third longitudinal corner to a fourth longitudinal corner;

placing the layout tool on a fourth face of the workpiece, the fourth face being adjacent to the first and third faces, with the base flange against the fourth longitudinal corner and the 90-degree straight edge aligned with a fourth point formed where the third layout line intersects the fourth longitudinal corner;

making a fourth layout line along the 90-degree straight edge of the layout tool on the fourth face from the fourth longitudinal corner to the first longitudinal corner, intersecting the starting point on the first longitudinal corner;

cutting the workpiece along a cutting plane formed by the first, second, third, and fourth layout lines, forming a first segment and a second segment of the workpiece;

orienting the first segment and the second segment to a desired angle; and joining the first segment and the second segment to form the mitered fitting.

5. A method of using a layout tool with a main body structure, a base flange perpendicular to the main body structure, a 90-degree straight edge, and an 11.25-degree straight edge to make a plurality of layout lines on a rectangular cross-section workpiece to define a cutting plane, comprising:

selecting a desired orientation of the cutting plane on the workpiece;

selecting a starting point for the layout lines on the workpiece such that the starting point is on a first longitudinal corner of a first face of the workpiece;

placing the layout tool on the first face of the workpiece with the base flange along the first longitudinal corner and the 11.25-degree straight edge aligned with the starting point;

making a first layout line on the first face along the 11.25-degree straight edge of the layout tool on the first face of the workpiece from the first longitudinal corner to a second longitudinal corner;

placing said layout tool on a second face of the workpiece, the second face being adjacent to the first face, with the base flange against the second longitudinal corner and the 90-degree straight edge aligned with a second point formed where the first layout line intersects the second longitudinal corner;

making a second layout line on the second face along the 90-degree straight edge of the layout tool on the second face from the second longitudinal corner to a third longitudinal corner;

placing said layout tool on a third face of said workpiece, the third face being adjacent to the second face, with the base flange against the third longitudinal corner, the 11.25-degree straight edge aligned with a third point formed where the second layout line intersects the third longitudinal corner, and the 11.25 degree straight edge oriented parallel to the first layout line;

making a third layout line on the third face along the 11.25-degree straight edge of the layout tool from the third longitudinal corner to a fourth longitudinal corner;

placing the layout tool on a fourth face of the workpiece, the fourth face being adjacent to the first and third faces, with the base flange against the fourth longitudinal corner and the 90 degree straight edge aligned with a fourth point formed where the third layout line intersects the fourth longitudinal corner;

making a fourth layout line along the 90-degree straight edge of the layout tool on the fourth face from the fourth longitudinal corner to the first longitudinal corner, intersecting the starting point on the first longitudinal corner;

cutting the workpiece along a cutting plane formed by the first, second, third, and fourth layout lines, forming a first segment and a second segment of the workpiece;

orienting the first segment and the second segment to a desired angle; and joining the first segment and the second segment to form the mitered fitting.

* * * * *